Sept. 17, 1968   J. C. KEPHART ET AL   3,401,999
MICROSCOPE

Filed Dec. 22, 1964   3 Sheets-Sheet 1

INVENTORS
Jack C. Kephart,
Ray L. Eigenbrode
BY Stevens, Davis, Miller & Mosher
ATTORNEYS

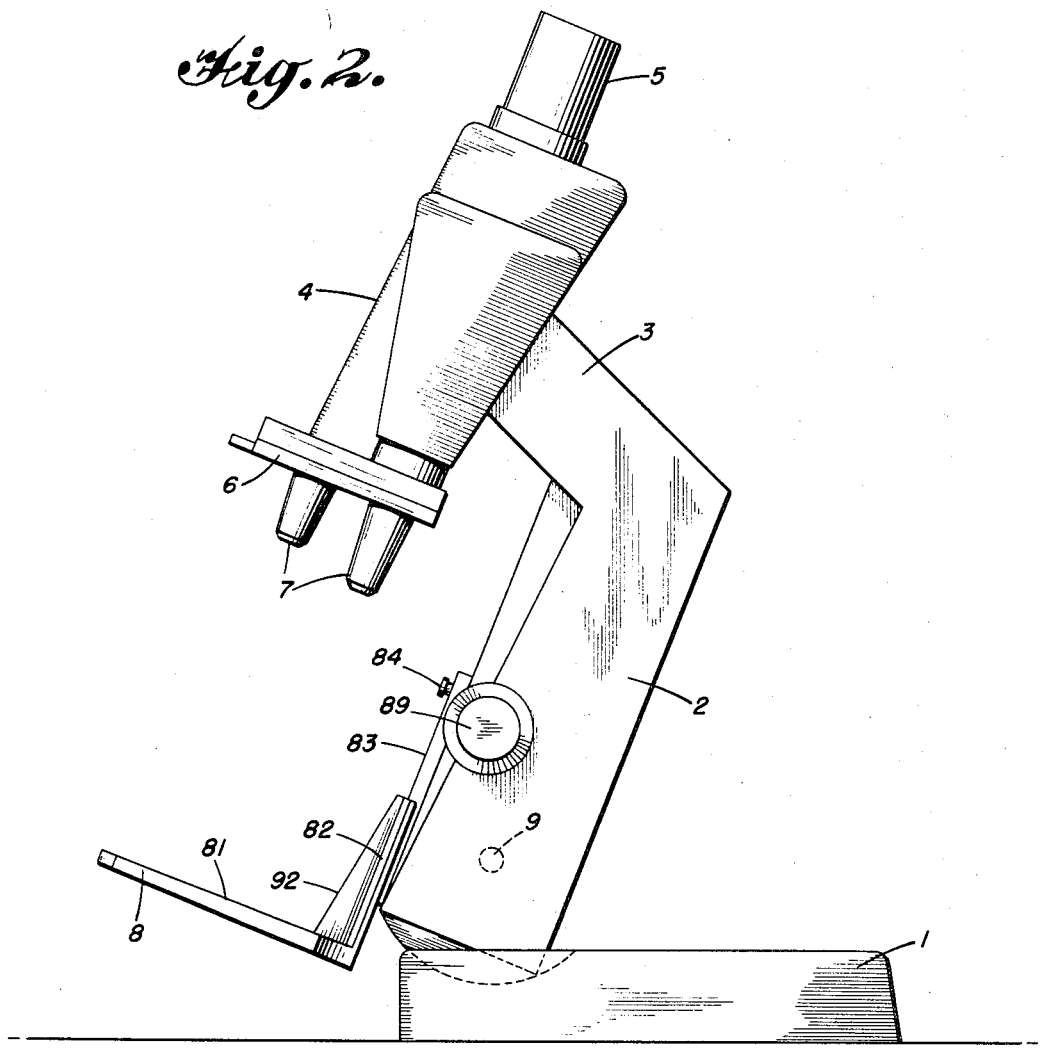
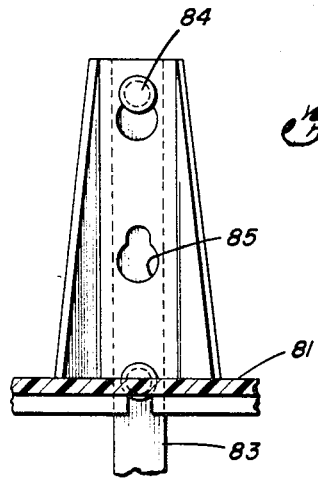

Sept. 17, 1968   J. C. KEPHART ET AL   3,401,999
MICROSCOPE

Filed Dec. 22, 1964   3 Sheets-Sheet 3

INVENTORS
Jack C. Kephart,
Ray L. Eigenbrode
BY Stevens, Davis, Miller & Mosher
ATTORNEYS

United States Patent Office 3,401,999
Patented Sept. 17, 1968

3,401,999
MICROSCOPE
Jack C. Kephart and Ray L. Eigenbrode, Hagerstown, Md., assignors to The Lionel Corporation, a corporation of New York
Filed Dec. 22, 1964, Ser. No. 420,335
8 Claims. (Cl. 350—86)

ABSTRACT OF THE DISCLOSURE

A nonprofessional microscope having a stage and objective carried on a common rigid standard which is rotatable and tiltable relative to a base member about mutually perpendicular axes.

---

This invention relates to microscopes of what may be called, the nonprofessional type, since they are particularly intended for use by school-age children for whom commonly found rocks, insects, plants, and even a rabbit's foot hide mysteries far more fascinating than the microbes which absorb the professional adult scientist.

Nonprofessional microscopes are well known; however, they commonly are constructed along the lines of professional miscroscopes and this presents disadvantages since the two respective types are not used to explore similar specimens. A professional microscope is used to magnify infinitesimally small specimens such as microbes which are confined to a slide. The slide is usually placed on a stage below a magnifying device called an objective, this comprising a lens and a focusing means therefor.

In such microscopes, the distance between the stage and the objective is generally a fixed distance and variations in the size of the specimen being viewed are compensated for by axial movement of the focusing lens; however, the range of such size variations is necessarily limited by the range of movement of the focusing lens. This limitation in range is not an inconvenience in professional microscopes since they are almost invariably used with identically sized slides or at least always to view very small specimens which easily fall within the limited movement range of the focusing lens.

On the other hand, the curious mind of the child is attracted to objects falling within a wide range of sizes e.g., from a worm to a sizeable rock, and it is necessary, therefore, to provide a wider range of adjustment between the stage and the objective than is permitted by the focusing lens itself.

It is, therefore, the object of the present invention to provide a nonprofessional microscope which is particularly suitable to view specimens falling within a wide range of sizes.

It is a further object of this invention to provide such a microscope through a simple, rugged, and inexpensive construction.

It is a further object of the present invention to provide a particular joint between the standard and base, which joint is uniquely simple and yet particularly effective to provide tilting and rotation of the standard relative to the base, while at the same time providing an effective means for rigidly securing the standard and base together.

It is a still further object of the present invention to provide in the aforementioned joint a means whereby the rigid position of the standard can be changed by simply exerting a force against the standard and without having to manipulate any adjustment or locking device.

The objects of this invention are generally realized by making the focusing lens itself stationary and by making the stage adjustable over a wide range of distances relative to the fixed lens. Further, the upright standard which supports the objective and the stage is made pivotable about a vertical axis so that the standard and stage can be rotated to face oppositely to the base and the stage may be lowered below the plane of the horizontal base support and thereby be able to accommodate larger objects than it could when the lowest position of the stage was limited by said base support; and, still further, the stage is made completely removable from the upright standard so that the lens may be completely unobstructed and thereby aimed at the surface of a tree, the ground, etc., in the manner of a simple hand magnifying glass, whereby focusing would be had by positioning the entire microscope relative to the tree, ground, etc.

Other than the above noted objects will become evident from a reading of the following detailed description which is related to the appended drawings, in which, FIGURE 1 is a vertical profile view of the microscope of this invention showing in dashed lines the pivotable feature of the upright standard about a horizontal axis;

FIGURE 2 is another profile view showing the standard pivoted 180° about its vertical axis from the position shown in FIGURE 1;

FIGURE 6 is a sectional view taken along line 6—6 of FIGURE 3.

Figure 1:
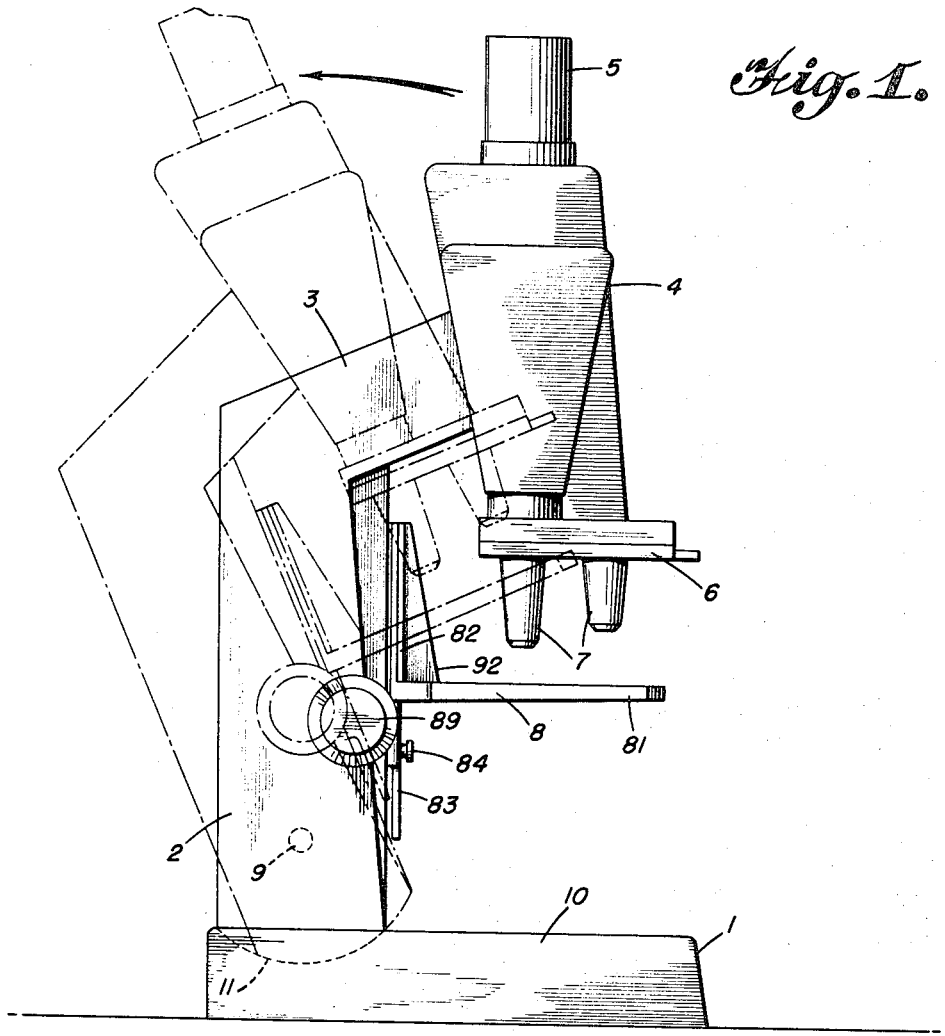

With reference to the drawings, and in particular to FIGURE 1, the microscope comprises a horizontal base 1 in the form of a rectangular, flat member. At one end of the base is pivotably supported an upright standard 2 which comprises an overhanging arm 3. At one end of the arm is rigidly supported a viewing objective 4 which comprises an eyepiece 5 and a movable lens turret 6, each located at opposite ends of the objective. The turret comprises a plurality of different lenses 7 which can be individually aligned with the eyepiece 5 through rotation of the turret.

A stage 8 is movably mounted on the upright portion of the standard so as to be adjustable towards and away from the lenses 7.

The standard 2 is pivotable about horizontal pivot pin 9, as is shown in dashed lines in FIGURE 1, for the purpose of permitting the line of sight (i.e., the straight line drawn through the aligned eyepiece 5 and a lens 7) to be adjusted so as to suit the comfort requirements of the individual user of the microscope.

The stage is removably mounted on the standard so that, if desired, a specimen could be supported directly on the flat shelf portion 10 of the base 1. It should here be noted that the turret 6 is not shown as being vertically adjustable for the purpose of focusing the lenses since such focusing is intended to be effected through adjustment of the stage. Therefore, with a specimen lying on the base shelf 10, focusing would be effected by tilting the standard 2 about its horizontal pivot axis. It should further be noted, however, that, if desired, means could also be provided to effect fine focusing without necessarily tilting the standard; for example, the turret 6 could be made vertically adjustable.

The standard 2 is also rotatable about its vertical axis from the position of FIGURE 1 to that of FIGURE 2 in order to permit the stage 8 to be lowered below the plane of the base 1.

The stage 8 could also be lowered in FIGURE 2 to an extent whereby it completely detaches from the standard 2. With the stage so detached, a still larger specimen could be supported on the ground, or a table, etc., on which the base 1 is resting and the lenses 7 could then be focused on the specimen by simply pivoting the standard about pin 9. Alternatively, if the specimen were even too large to fit between the lenses 7 and the ground or table while the base 1 was resting thereon, or if it were desired to view an immovable specimen such as the bark on a standing tree or the surface of the ground, or the surface of a large boulder, etc., the entire microscope could be picked up and supported by hand with the unobstructed lenses 7 being aimed at the immovable specimen and with focusing of the lenses being controlled through the moving of the entire microscope much in the manner in which a hand magnifying glass is used.

The specific constructional features which permit the realization of the above described functions will now be described.

Figure 4:
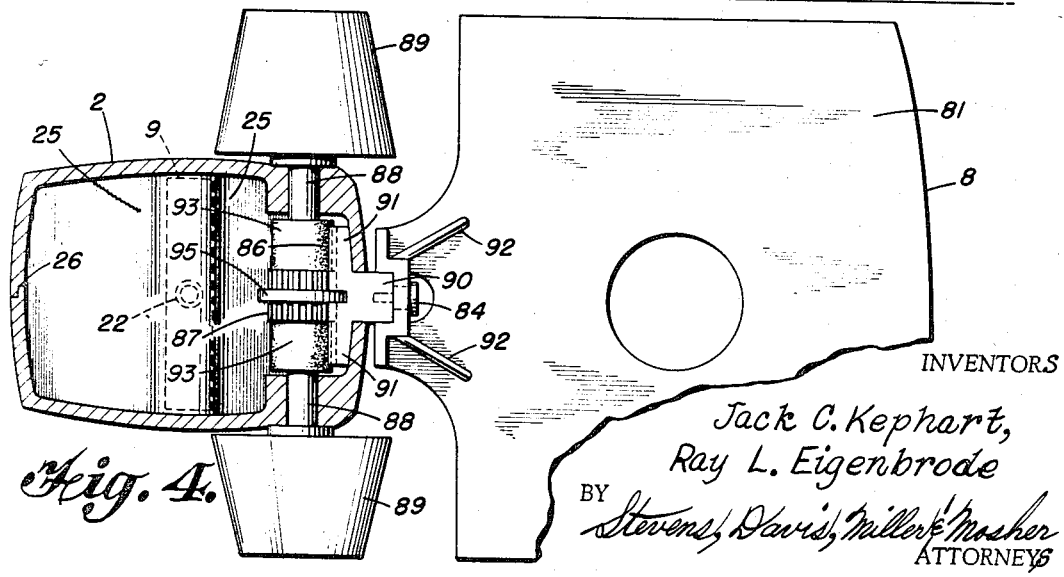
FIGURE 4 is a top plan view of the microscope showing a section taken along line 4—4 of FIGURE 3.
Figure 3:
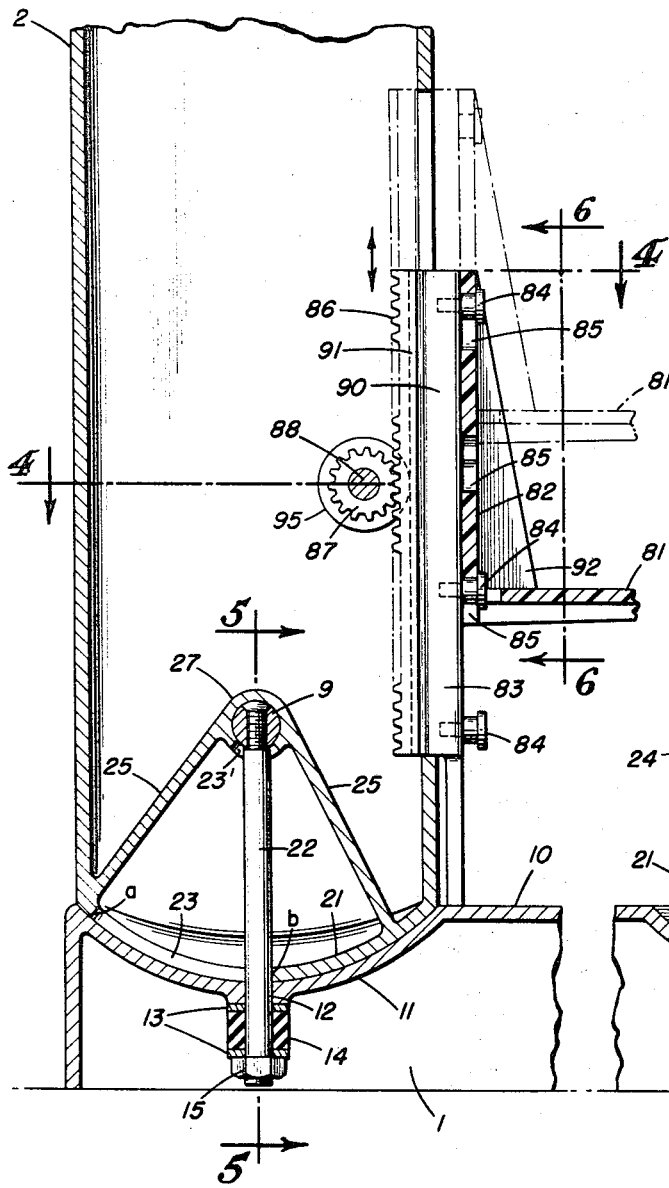
FIGURE 3 is a vertical section through portions of the standard, the base, and the stage.

The stage 8 comprises an L-shaped member with a horizontal leg 81 serving as a support platform for a specimen while a vertical leg 82 is attached to a focusing track 83 (FIGURE 3). The track 83 is movably mounted on a face of the standard 2 and comprises studs 84 which fit through keyhole-shaped slots 85 in the leg 82. By virtue of these slots 85, the stage is easily detachable from the track 83. The track 83 in turn comprises a rack gear 86 along one vertical face thereof. This rack gear engages a rotary gear or pinion 87 which is rotatably mounted on the standard. As is seen in FIGURE 4, the rotary gear 87 comprises axially extending pivot pins 88 which in turn have finger-grip knobs 89 at opposite ends which permit a person to turn the gear 87 and thereby adjust the position of the track 83 relative to the lenses 7. Of course, the track 83 in turn positions the stage 8 relative to the lenses 7.

As seen in FIGURE 3, the track comprises three vertically spaced studs 84 and the stage comprises three vertically spaced key slots 85, the spacing between the studs and between the slots being such that the stage can be selectively supported on different pairs of said studs, thus making the stage 8 adjustable relative to the track 83.

The teeth in the rack gear extend all the way to the top of the track so that the track is completely removable from the standard by virtue of its being lowered (in FIGURE 2) to the point where the teeth in the rack gear no longer engage the teeth in the rotary gear. The track 83 and the stage 8 are, therefore, removable from the standard as a single unit.

In the preferred embodiment which is shown in the drawings, the track 83 is slidably mounted in the standard by means of a T-shaped construction wherein the arm 90 (FIGURE 4) extends through a vertical slot in the standard while the shoulders 91 bear against the inner side of the standard. The studs 84 may be screwed into the arm 90 or preferably, the arm and studs are integrally molded as a unitary structure.

Sleeves 93 (FIGURE 4), made of rubber or some other friction material, are fixedly mounted on pins 88 on either side of the pinion 87. These sleeves rotate with the pinion and frictionally roll on the inner face of the track 83 when the track is raised or lowered. The purpose of these sleeves is to give a positive feel to the user of the microscope when said user turns the knobs 89. Further the sleeves 93 serve to smoothen the movement of the track and also to take up any play which may exist between the rack and pinion.

In the preferred embodiment, as shown in FIGURE 4, the pinion 87 is in two axial halves separated by a centering ring 95 which is of greater diameter than the pinion. The portion of ring 95 which extends beyond the outer circumference of the pinion is received in a longitudinally extending slot in the track 83. The ring 95, therefore, serves to maintain the pinion assembly and the track properly aligned with each other in a transverse direction and further, eliminates any side play between the pinion assembly and the track.

The vertical brackets 92 serve as stiffening members for the stage.

Figure 5:
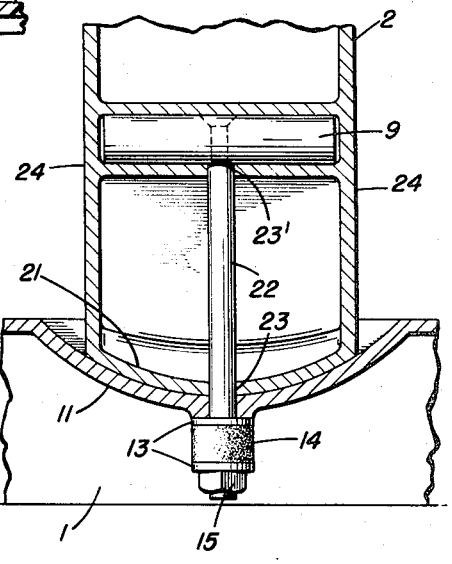
FIGURE 5 is a sectional view taken along line 5—5 of FIGURE 4.

The present invention also comprises a unique structural arrangement for attaching the standard 2 to the base 1 so that the standard is pivotable about a horizontal axis while also being rotatable about a vertical axis. This unique arrangement is shown in FIGURES 3 and 5. The base 1 comprises at one end thereof a concave spherical top wall portion 11 defining a socket whose curvature corresponds to a convex or ball end wall 21 in the bottom of the standard. Extending perpendicular to the longitudinal or vertical axis of the standard is the pivot pin 9 which is pivotally mounted within the bearing 27. Extending perpendicularly to the pivot pin 9 is a longitudinal securing pin 22 which passes through the standard ball end wall 21 and through a hole 12 in the socket wall 11 and comprises a threaded end portion upon which are fitted the washers 13 between which is located a compressible rubber sleeve 14. At the extreme end of the pin 22 is a threaded nut 15 which, when tightened, draws the walls 11 and 21 into tight or frictional contact with each other thereby restricting any relative movement therebetween.

The lower end portion of the standard 2 comprises a slot 23 and the bearing 27 comprises a corresponding slot 23' which extend perpendicular to the axis of pin 9 so that in FIGURE 5 the slot 23 appears in end view as being just wide enough for the pin 22 while in FIGURE 3 the slot is shown as extending between points a–b in the convex wall 21. The walls 25—25 in FIGURE 3 are bracing walls for the bearing 27.

The above described ball and socket joint between the standard 2 and the base 1 functions as follows.

Primarily, when the standard and base are initially assembled, the nut 15 is tightened and the rubber sleeve 14 is thereby compressed. The compression in the sleeve 14 urges the spherical walls on the standard and base into friction-tight relationship with each other. When this adjustment is made properly, it becomes unnecessary to adjust nut 15 each time an angular or rotational adjustment of the standard is made.

When it is desired to tilt the standard about the pivot pin 9, to a new position as is shown in dashed lines in FIGURE 1, or when it is desired to rotate the standard 180° from the position of FIGURE 1 to that of FIGURE 2, the standard is manually gripped and forcibly pivoted and/or rotated to its new position. The amount of manual force which is necessary to accomplish this is only that which is sufficient to overcome the force exerted by rubber sleeve 14. When the user finally releases the standard, it will remain rigidly in position by virtue of the resilient sleeve 14 continuing to urge the standard and base into frictional contact with each other.

With regard to the size of slot 23, since it is desired to maintain the surface area of wall 21 at a maximum in order to provide more effective frictional contact between wall 21 and wall 11, preferably the slot is made only as large as is necessary to permit free movement of the standard relative to pin 22.

The standard and base could be either of solid construction, or of hollow construction as shown in FIGURES 3–5. In FIGURE 4 the standard is shown as comprising two mating shells joined together at joints such as joint 26.

The various parts can be made of various materials; for example, the base and standard could be made of zinc while the track and stage could be made of a plastic material. In any case the device is not limited as to the materials from which it is made or as to whether the parts are hollow or solid.

Various other modifications which are within the purview of one skilled in the art are intended to be embraced by the claims which follow.

The following is claimed:

1. A microscope of the nonprofessional type comprising a base and an upright standard attached to said base, a viewing objective attached to the upper end of said standard, said objective comprising a visual magnifying means upwardly spaced from said base, a stage mounted on said standard and comprising a horizontal platform for supporting specimens thereon, said platform being located between said magnifying means and said base and being adjustably movable in a longitudinal direction in the space between said magnifying means and said base, said standard being attached to said base by joint means whereby said standard is rotatable relative to said base about a vertical axis between a first position where the line of sight of said objective is centrally directed towards said base shelf to a second position up to 180° opposed to said first position, and whereby said standard is also tiltable about a horizontal axis simultaneous to its being rotatable about a vertical axis, said standard constituting a rigid link between said objective and stage whereby any movements of said standard are identically imparted to said stage and objective and wherein said joint means comprises mutually contacting correspondingly curved walls on said standard and base respectively, said curved walls being slidably movable relative to each other, tightening means for urging said curved walls tightly against each other.

2. The microscope of claim 1, wherein said base presents a flat unobstructed surface and said standard is attached to one end of said base, said stage being removable from its position between said magnifying means and said base whereby specimens can be placed directly onto said surface and viewed through said magnifying means.

3. The miscrospoce of claim 1, wherein said stage is attached to a focusing track which comprises a rack which extends generally perpendicular to said platform, a pinion engaging said rack, said pinion being rotatably mounted on said standard, a knob for rotating said pinion, said platform being movable through rotation of said knob.

4. The microscope of claim 3, wherein said stage is removably and adjustably mounted on said focusing track.

5. The miscroscope of claim 4, wherein said focusing track comprises said rack gear on one vertical face thereof and three horizontally extending studs on an opposite face thereof, said studs being vertically aligned and spaced from each other, said stage comprising a leg at one end of said platform and extending generally perpendicular thereto, said leg comprising keyhole shaped holes which are spaced so as to receive any two adjacent ones of said studs at one time, said stage being removably mounted on any two of said studs by virtue of said studs extending through said holes.

6. The microscope of claim 1, a horizontal pivot pin pivotably mounted in said standard, a securing pin rigidly connected to said pivot pin and extending perpendicular thereto, said securing pin having a free end which extends outwardly of the bottom end of said standard and through both said spherical walls, said tightening means being on said free end and acting against said base and urging said securing pin downwardly, said securing pin thereby acting through said standard and urging said walls tightly against each other.

7. The miscroscope of claim 6, wherein said tightening means comprises an adjustment member and a resilient compression member, said compression member being located between said base and said adjustment member, said adjustment member being adjustably movable along the free end of said securing pin and thereby being adapted to compress said compression member against said base.

8. The miscroscope of claim 7, wherein said compression member is a rubber sleeve mounted on the free end of said securing pin and wherein said adjustment member is a nut threaded on the free end of said securing pin.

References Cited
UNITED STATES PATENTS

| | | | |
|---|---|---|---|
| 370,774 | 10/1887 | Fuller | 287—91 |
| 1,189,988 | 7/1916 | Moody | 211—90 |
| 1,267,862 | 5/1918 | Hoefliger | 350—85 |
| 1,987,776 | 1/1935 | Hauser | 350—85 |
| 3,030,135 | 4/1962 | Polanski | 287—91 |

DAVID SCONBERG, *Primary Examiner.*

M. J. TOKAR, *Assistant Examiner.*